US012727073B2

(12) United States Patent
Vincenti et al.

(10) Patent No.: US 12,727,073 B2
(45) Date of Patent: Sep. 1, 2026

(54) METHOD AND SYSTEM FOR ACCELERATING ELECTRONS USING LASER-PLASMA INTERACTION

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); ECOLE POLYTECHNIQUE, Palaiseau Cedex (FR); ECOLE NATIONALE SUPERIEURE DE TECHNIQUES AVANCEES, Palaiseau Cedex (FR)

(72) Inventors: Henri Vincenti, Gif sur Yvette (FR); Adrien Leblanc, Palaiseau (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); ECOLE POLYTECHNIQUE, Palaiseau (FR); ECOLE NATIONALE SUPÉRIEURE DE TECHNIQUES AVANCÉES, Palaiseau (FR)

( * ) Notice: Subject to any disclaimer, the term of this patent is extended or adjusted under 35 U.S.C. 154(b) by 151 days.

(21) Appl. No.: 18/855,483

(22) PCT Filed: Apr. 7, 2023

(86) PCT No.: PCT/EP2023/059338
§ 371 (c)(1),
(2) Date: Oct. 23, 2024

(87) PCT Pub. No.: WO2023/198653
PCT Pub. Date: Oct. 19, 2023

(65) Prior Publication Data

US 2025/0254785 A1 Aug. 7, 2025

(30) Foreign Application Priority Data

Apr. 14, 2022 (FR) .................................... 2203449

(51) Int. Cl.
*H05H 15/00* (2006.01)

(52) U.S. Cl.
CPC .................................. *H05H 15/00* (2013.01)

(58) Field of Classification Search
CPC ................................................ H05H 15/00
See application file for complete search history.

(56) References Cited

U.S. PATENT DOCUMENTS

2021/0219410 A1* 7/2021 Fourmaux .......... G01N 33/0098

OTHER PUBLICATIONS

Thevenet, et al., "Vacuum laser acceleration of relativistic electrons using plasma mirror injectors", Nature Physics, vol. 12, No. 4, pp. 355-360, 2016.

(Continued)

*Primary Examiner* — Henry Luong
(74) *Attorney, Agent, or Firm* — BakerHostetler

(57) ABSTRACT

A method for accelerating electrons using laser-plasma interaction, wherein at least one laser pulse is directed onto a surface of a target in the condensed state, the surface being covered with a gas layer, the intensity of the at least one pulse being sufficient in order to: in a step A, generate, from the target in the condensed state, a dense plasma; in a step B, after reflection by the dense plasma, generate a wakefield in the gas layer; in a step C, heat the electrons of the dense plasma to an energy such that a bunch of the electrons is injected into the wakefield in order to be accelerated there, the pulse, or at least the pulse intended to be reflected by the dense plasma and to heat the electrons of the latter, being s-polarized and obliquely incident on the target.

20 Claims, 5 Drawing Sheets

(56) References Cited

OTHER PUBLICATIONS

Haessler, et al., "High-Harmonic Generation and Correlated Electron Emission from Relativistic Plasma Mirrors at 1 kHz Repetition Rate", arxiv.org, Cornell University, 2021.
Ma, et al., "Ultrahigh-charge electron beams from laser-irradiated solid surface", arxiv.org, Cornell University, 2017.
Indorf, et al., "Investigation of the ejected mass during high-intensity laser solid interaction for improved plasma mirror generation", Plasma Physics and Controlled Fusion, vol. 64, No. 3, 2022.
Esarey, et al., "Physics of laser-driven plasma-based electron accelerators", Rev. Mod. Phys., vol. 81, 1229, 2009.
Gonsalves, et al., "Petawatt Laser Guiding and Electron Beam Acceleration to 8 GeV in a Laser-Heated Capillary Discharge Waveguide", Phys. Rev. Lett., vol. 122, 2019.
Levy, et al., "Double plasma mirror for ultrahigh temporal contrast ultraintense laser pulses", Opt Lett., vol. 32, No. 3, pp. 310-312, 2007.
Zaim, et al., "Relativistic Acceleration of Electrons Injected by a Plasma Mirror into a Radially Polarized Laser Beam", Phys. Rev. Lett., vol. 119, No. 9, 2017.

* cited by examiner

METHOD AND SYSTEM FOR ACCELERATING ELECTRONS USING LASER-PLASMA INTERACTION

CROSS-REFERENCE TO RELATED APPLICATIONS

This application is a National Stage of International patent application PCT/EP2023/059338, filed on Apr. 7, 2023, which claims priority to foreign French patent application No. FR 2203449, filed on Apr. 14, 2022, the disclosures of which are incorporated by reference in their entireties.

FIELD OF THE INVENTION

The present invention relates to a method and a system for accelerating electrons using laser-plasma interaction. It notably relates to the field of accelerating electrons using femtosecond lasers ranging from the terawatt (TW) class to the multi-PW (petawatt) class using a laser wakefield acceleration (LWFA) mechanism.

BACKGROUND

Accelerating electrons to relativistic energies over very short distances using lasers is a long-standing objective in physics and is of great fundamental interest. Indeed, this acceleration mechanism notably makes it possible to reproduce and understand physical processes which can be found only in extreme astrophysical scenarios. It furthermore makes it possible to produce accelerators which are much more compact than conventional accelerators for high-energy physics and medicine.

By focusing pulses delivered by femtosecond lasers ranging from the TW class to the multi-PW class at focal spots of a few microns to a few tens of micrometers it is possible to obtain intensities higher than $10^{18}$ W/cm$^2$ producing electric fields of several TV/m. When the normalized peak amplitude $a_1$ of the pulse is higher than or equal to 1, the electron oscillates in the laser field with relativistic dynamics. That is to say that the speed of this electron is close to the speed of light.

As a reminder, the normalized peak amplitude $a_1$ is defined by:

$$a_1 = \frac{eE_L}{m_e\omega_1 c}$$

with e and $m_e$ being the charge and the mass of the electron, respectively, $E_L$ the peak amplitude of the pulse (expressed in V/m), $\omega_1$ the angular frequency of the laser and c the speed of light. For a wavelength $$\lambda = 1\ \mu\text{m},$$

it is the case that $$a_1 > 1$$

for an intensity higher than $10^{18}$ W/cm$^2$.

If a sample of matter is placed at the focal point of the laser, the extreme electric fields ionize the matter quasi-instantaneously and form an ultra-relativistic plasma, the electrons being accelerated to a speed close to that of light over timescales lower than one fs. This makes it possible to study ultra-relativistic, non-equilibrium and highly nonlinear physics, called "ultra-high-intensity physics".

There are several means for making it possible to accelerate electrons using such laser fields.

Among the different existing methods, vacuum laser acceleration (VLA) has aroused considerable interest and has been the subject of in-depth theoretical studies because of its apparent simplicity. In this method, the electrons interact with an intense laser field, in the vacuum, and can be accelerated continuously, on the condition that they remain in a given phase of the field until they escape from the laser beam. In the VLA method, the laser field itself delivers electric fields of several TV/m which can in principle accelerate the electrons to relativistic speeds over the Rayleigh length of the laser. Until recently, the VLA method was essentially studied from a theoretical point of view as the necessary conditions for correctly injecting electrons into the laser field were extremely difficult. Indeed, the injected electron bunch must be ultra-short (much shorter than a laser period <3 fs) and injected in a very precise acceleration phase with sub-fs precision.

The feasibility of this injection method using a relativistic plasma mirror has been demonstrated in the document Thévenet, M., et al. "Vacuum laser acceleration of relativistic electrons using plasma mirror injectors". *Nature Physics* 12.4 (2016): 355-360, below "Thévenet et al.". FIG. 1A schematically illustrates the principle of this technique. An ultra-brief p-polarized incident laser pulse (~25 fs) is focused with an intensity higher than $10^{18}$ W/cm$^2$ on a plasma mirror which is reflective for the field of the incident laser pulse. The plasma mirror is generated under a vacuum by ionizing an initially solid target using a laser prepulse which is focused with an intensity higher than $10^{16}$ W/cm$^2$. Under the effect of this laser field, the "plasma mirror" thus formed oscillates at relativistic speeds in the laser period. Upon the reflection on the surface of the plasma mirror, the field E of the incident laser pulse ejects electrons from the surface of the plasma mirror and injects it into the reflected laser field. The injected charge is then accelerated by the ultra-intense electric field of the laser pulse.

Unfortunately, this method presents the disadvantage of providing poor-quality electron beams. More specifically, the electron beams produced using VLA exhibit high divergence (more than 500 mrad) and high energy dispersal, which makes this method unusable for certain applications. Furthermore, the maximum energy of the VLA mechanism changes in line with the square root of the laser power P, which does not make it a good candidate for reaching high energies (see Zaïm, M. Thevenet, A. Lifschitz, and J. Faure, "Relativistic Acceleration of Electrons Injected by a Plasma Mirror into a Radially Polarized Laser Beam", *Phys. Rev. Lett.*, vol. 119, no. 9, p. 094801, August 2017, doi: 10.1103/PhysRevLett.119.09480).

Another technique known to a person skilled in the art (see notably the document E. Esarey, C. B. Schroeder, and W. P. Leemans "Physics of laser-driven plasma-based electron accelerators", Reviews Of Modern Physics, Volume 81, July-September 2009) for accelerating electrons using laser-plasma interaction is the laser wakefield acceleration (LWFA) mechanism. FIG. 1B is a schematic depiction of the operation of this mechanism. In the LWFA method, a laser delivers ultra-brief pulses which are focused in a gas with a high intensity, typically higher than $10^{18}$ W/cm$^2$. At the focal point of the laser, the gas is ionized quasi-instantaneously by the ultra-intense laser field and forms an "under-dense" plasma, of an electronic density typically between $10^{17}$ cm$^{-3}$ and 1020 cm$^{-3}$. A plasma is referred to as "under-dense"

when the plasma frequency, which is proportional to the square root of the density, is lower than the frequency of the laser. For laser intensities higher than $10^{18}$ W/cm$^2$, the laser pulse (via the ponderomotive force which it brings about) violently expels the electrons from its trajectory as it propagates and forms a "bubble" which is empty of electrons in its wakefield, which can withstand large accelerating fields of the order of 100 GV/m. Certain electrons of the plasma can then be trapped in this bubble and be accelerated to relativistic speeds over lengths of a few millimeters to a few centimeters.

This LWFA mechanism makes it possible to accelerate electrons to 8 GeV at the cm scale (see A. J. Gonsalves et al., "Petawatt Laser Guiding and Electron Beam Acceleration to 8 GeV in a Laser-Heated Capillary Discharge Waveguide", Phys. Rev. Lett., vol. 122, no. 8, p. 084801, February 2019, doi: 10.1103/PhysRevLett.122.084801). That is why it is considered as one of the most promising candidates for constructing the next generation of compact particle accelerators which are dedicated to high-energy physics. At the current time, LWFA devices can already provide high-quality electron beams: ultra-short (a few fs), small in size (μm scale), with low divergence and with low energy dispersal (a few %). However, LWFA devices currently suffer from a relatively low charge per electron bunch at high energy (around ten pC at a few GeV).

Thus, the problem arises of increasing the charge per electron bunch obtained using LWFA while at the same time preserving its good quality in terms of briefness, spatial dimensions, divergence and energy dispersal.

Producing such beams at a high charge is crucial for many applications such as radiotherapy at a very high dose rate, compact X-ray free-electron lasers or indeed the next generation of particle colliders which are based on a multi-PW laser system.

SUMMARY OF THE INVENTION

To this end, the subject of the invention is a method and a system for accelerating electrons using laser-plasma interaction which are based on the laser wakefield acceleration mechanism. Unlike the LWFA devices from the prior art, the electrons are injected from the reflection of an ultra-brief laser pulse directed so as to be s-polarized and obliquely incident on a previously generated dense plasma, whereby a laser wakefield is then generated within the gas. The laser pulse heats the electrons of dense plasma to an energy such that a bunch of the electrons is injected into the wakefield in order to be accelerated there. Thus, it is possible to obtain an electron beam with ultra-brief electron bunches and exhibiting low divergence, high charge for high energy and low energy dispersal.

With respect to the LWFA devices from the prior art, the invention makes it possible to considerably increase the charge of the electron bunch while at the same time maintaining optimal electron beam quality. With respect to VLA devices, the invention makes it possible to notably improve the quality of the electron beam (divergence and energy dispersal).

To this end, one subject of the invention is a method for accelerating electrons using laser-plasma interaction, wherein at least one laser pulse is directed onto a surface of a target in the condensed state, said surface being covered with a gas layer, the intensity of said at least one pulse being sufficient in order to:

in a step A, generate, from the target in the condensed state, a dense plasma;

in a step B, after reflection by the dense plasma, generate a laser wakefield in the gas layer;

in a step C, heat the electrons of said dense plasma to an energy such that a bunch of said electrons is injected into said wakefield in order to be accelerated there, said pulse, or at least the pulse intended to be reflected by the dense plasma and to heat the electrons of the latter, being s-polarized and obliquely incident on said target.

In a first variant of the method of the invention, the generation of the dense plasma in step A is induced by one of said at least one laser pulse referred to as the prepulse and steps B and C are induced by one of said at least one laser pulse referred to as the main pulse and, in step B, said main pulse is spatially superimposed on the prepulse and exhibits a time delay with respect to the prepulse.

Preferably, in this first variant:

said time delay is sufficiently small in order for a scale length of the gradient of the dense plasma to be lower than a wavelength of the main pulse, and/or said time delay is between 50 fs and 200 ps.

Preferably, in this first variant, the method comprises a step of adjusting said time delay so as to optimize a charge of said electron bunch injected into said wakefield.

Preferably, in step A of this first variant, the intensity of the prepulse is higher than $10^{15}$ W/cm$^2$ on said surface and, in step B, the intensity of the main pulse is higher than $10^{18}$ W/cm$^2$ after reflection by said dense plasma.

Preferably, in this first variant, the method comprises a step, prior to steps A and B, of generating the prepulse and the main pulse from the same laser pulse, referred to as the initial laser pulse.

Preferably, in this first variant, the method comprises a step, prior to steps A and B, of increasing the temporal contrast of the main pulse by reflection on one or more additional plasma mirrors.

Preferably, in the method of the invention, an average pressure in the gas layer is between 0.1 atm and 200 atm, preferably between 0.5 atm and 50 atm.

Another subject of the invention is a system for accelerating electrons using laser-plasma interaction, comprising:

a target in the condensed state covered with a gas layer, a laser system adapted to generate at least one laser pulse, an optical system adapted to direct said at least one laser pulse onto a surface (SS) of the target in the condensed state, the laser system and the optical system furthermore being configured so that the intensity of said at least one pulse is sufficient in order to:

generate, from the target in the condensed state, a dense plasma;

after reflection by the dense plasma, generate a wakefield in the gas layer;

heat the electrons of said dense plasma to an energy such that a bunch of said electrons is injected into said wakefield in order to be accelerated there, the optical system furthermore being adapted so that said pulse, or at least the pulse which is intended to be reflected by the dense plasma and to heat the electrons of the latter, is s-polarized and obliquely incident on said target.

Preferably, according to a first variant, the laser system and the optical system are configured to:

generate a first said pulse, referred to as the prepulse, and direct it toward the target in order to generate said dense plasma, generate a second said pulse, referred to as the main pulse, and direct it toward the target in order to generate said wakefield in the gas layer and induce said heating of the electrons of said dense plasma, said main pulse, when it is reflected by the dense plasma, being spatially superimposed on the prepulse.

Preferably, in this first variant, said laser system is adapted so that the temporal contrast of the main pulse is higher than $10^8$, preferably higher than $10^{10}$.

Preferably, the system of the invention comprises a gas burner connected to a gas tank, the gas burner being adapted to deliver a gas jet configured to form the gas layer. Still preferably, the system of the invention comprises a gas cell sealed or partially sealed by the target, the gas burner being adapted to deliver the gas jet into the gas cell. Still preferably, the target is formed by a piece of tape which unwinds from a spool, said system comprising a motor assembly adapted to unwind said tape into the cell.

Preferably, in the system of the invention, the gas tank comprises helium and/or hydrogen and/or nitrogen.

Preferably, in the system of the invention, the gas burner is adapted so that an average pressure in the gas layer is between 0.1 atm and 200 atm, preferably between 0.5 atm and 50 atm.

BRIEF DESCRIPTION OF THE DRAWINGS

Other features, details and advantages of the invention will become apparent upon reading the description given with reference to the appended drawings given by way of example and which depict, respectively.

DETAILED DESCRIPTION

Figure 2:
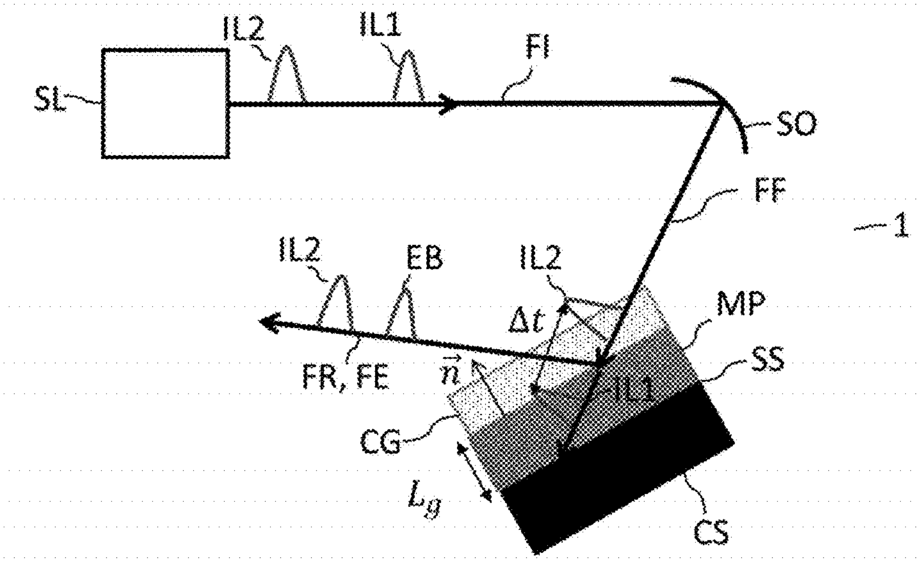

FIG. 2 schematically illustrates a system 1 according to a preferred first variant of the invention for accelerating electrons using laser-plasma interaction. It is composed mainly of a laser system SL, for delivering an initial laser beam FI carrying a first pulse referred to as the prepulse IL1 and a second pulse referred to as the main pulse IL2, and of an optical system SO for focusing these pulses IL1, IL2 on a target in the solid state CS (more generally in the condensed state, it also being possible to use a liquid target). The beam FI is focused by the optical system SO on a surface SS of the target CS so as to form a focused laser beam FF. In the invention, the surface SS of the target CS is covered with a gas layer CG.

The laser system SL and the optical system SO are adapted so that the intensity of the prepulse IL1 is sufficient in order to, in a step A, generate a dense plasma MP at the surface SS of the target by ionizing the target CS. Preferably, the intensity of the prepulse IL1 is higher than $10^{15}$ W/cm$^2$ on the surface SS in order to be able to ionize the target CS and thus generate the dense plasma MP. The intensity in W/cm$^2$ mentioned here and in the remainder of the document corresponds here to the peak intensity of the pulse IL1 or IL2 at the surface where the pulse IL1 or IL2 is focused.

What is meant here by "dense plasma" is that the electronic density ne of the plasma is such that the plasma frequency $$\omega_p = \sqrt{\frac{n_e e^2}{m_e \varepsilon_0}}$$

($\varepsilon_0$ being the electric permittivity of the vacuum) is higher than the frequency of the laser pulse intended to be reflected by the dense plasma MP (that is to say the main pulse IL2). This condition makes it possible to reflect the main pulse IL2 on the dense plasma MP in a step subsequent to step A. Otherwise, the laser pulse would propagate in the plasma instead of being reflected by the latter.

Figure 1A:
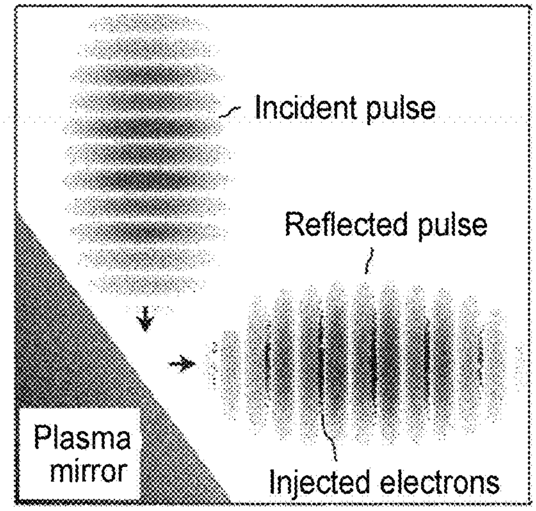
FIG. 1A and FIG. 1B, a schematic illustration of the methods known from the art for accelerating electrons using laser-plasma interaction in the vacuum and using a laser wakefield acceleration mechanism, respectively, FIG. 2, a schematic diagram of the system according to a preferred variant of the invention, FIG. 3, three instantaneous depictions a, b and c of a PIC code simulation, which are obtained at different instants of the method according to the preferred variant of the invention, FIG. 4A, a graphical depiction of a spectrum of the electron beam generated by the system of the invention obtained by simulation, FIG. 4B, a graphical depiction of an experimental result: a spectrum of the electron beam generated by the system of the invention, FIG. 5, a schematic depiction of a system according to a first embodiment of the invention, FIG. 6, a schematic depiction of the system according to a second embodiment of the invention, FIG. 7, a schematic depiction of the system according to a third embodiment of the invention, In the figures, unless stated otherwise, the elements are not to scale.
Figure 1B:
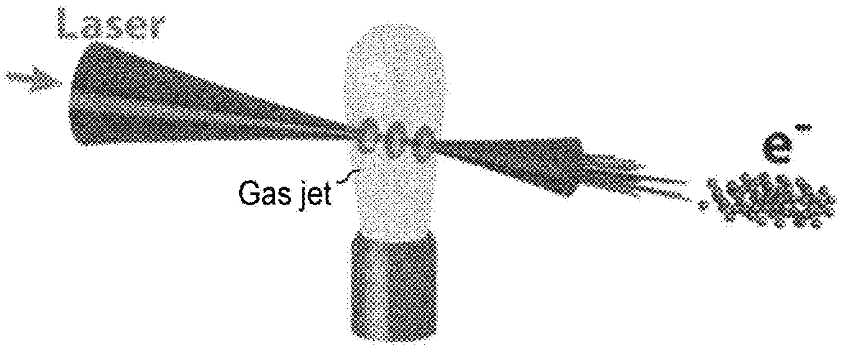

Furthermore, the laser system SL and the optical system SO are adapted so that the intensity of the main pulse IL2 is sufficient in order to:

in a step B, after reflection by the dense plasma MP, generate a laser wakefield WF in the gas layer. The laser beam reflected by the dense plasma MP is denoted by the reference sign FR in FIG. 2. This wakefield is similar to that described in detail above for the description of FIG. 1B.

in a step C, heat the electrons of the dense plasma to an energy such that a bunch EB of the electrons is injected into the wakefield WF in order to be accelerated there. Thus, the reflection of the beam FF on the dense plasma MP generates an electron beam FE. The minimum energy which makes injection possible is typically 100 keV.

In the first variant of the invention it is necessary for the main pulse IL2 to be focused toward the target CS so as to be obliquely incident and s-polarized for reasons which will be explained below. In addition, as explained above, the plasma frequency wp of the plasma generated by the prepulse L1 must be higher than the frequency of the main pulse IL2, denoted by $\omega_2$, in order to make it possible to reflect the main pulse IL2 on the dense plasma MP. Finally, it is necessary for the main pulse IL2, when it is reflected by the dense plasma, to be spatially superimposed on the prepulse IL1, in order to optimize the ejection of the electrons from the dense plasma MP. The time delay of the main pulse IL2 when it is focused on the dense plasma with respect to the prepulse IL1 when it generates the dense plasma is denoted by $\Delta t$.

In the VLA devices from the prior art (for example, Thévenet et al.), the injection is caused by the laser field E present in the normal direction $\vec{n}$ to the surface of the plasma mirror which "tears away" the electrons from the mirror and injects them into the laser field E in a region where the plasma electrostatic field does not make acceleration possible. This generates a poor-quality electron beam FE (high divergence and high energy dispersal).

In the invention, the injection mechanism is different. Indeed, critically, the main laser pulse IL2, which is intended to be reflected by the dense plasma (and to heat the electrons of the latter), is directed so as to be s-polarized and obliquely incident on the target CS. As a result, there is no field E in the normal direction $\vec{n}$ to the surface of the dense plasma MP. In the invention, the injection is caused in two steps: first of all by the heating of the electrons of the dense plasma by means of the laser pulse when it is reflected on the dense plasma. Then, some of these electrons heated to a sufficient energy are then trapped in the electrostatic field of the bubble of the laser wakefield with a phase which is suitable for being accelerated there over lengths of several millimeters to a few centimeters.

By virtue of the high electronic density of the dense plasma MP, this mechanism makes it possible to inject a high charge of electrons of a few MeV to around ten MeV with a modest laser energy (typically higher than 10 pC with a few hundred millijoules), and preferably higher than 100 pC, or even 1 nC, for a high laser energy of several joules to tens of joules. Critically, the electron bunches EB are injected with an appropriate phase into the bubble of the laser wakefield, which makes it possible to obtain a good-quality electron beam FE (low divergence and low energy dispersal) with energies of several hundred MeV to a few GeV at the end of the wakefield acceleration.

Thus, it is possible to obtain an electron beam FE with ultra-brief bunches and exhibiting low divergence, high charge for high energy and low energy dispersal. With respect to the LWFA devices from the prior art (see FIG. 1B), the invention therefore makes it possible to considerably increase the charge of the electron bunch while at the same time maintaining optimal beam quality. Indeed, the electronic density of the dense plasma is much higher than that of the ionized gas. With respect to VLA devices (see FIG. 1A), the invention therefore makes it possible to notably improve the quality of the electron beam (divergence and energy dispersal) since the electrons are injected at the rear of the bubble of the wakefield in the invention.

Figure 3:
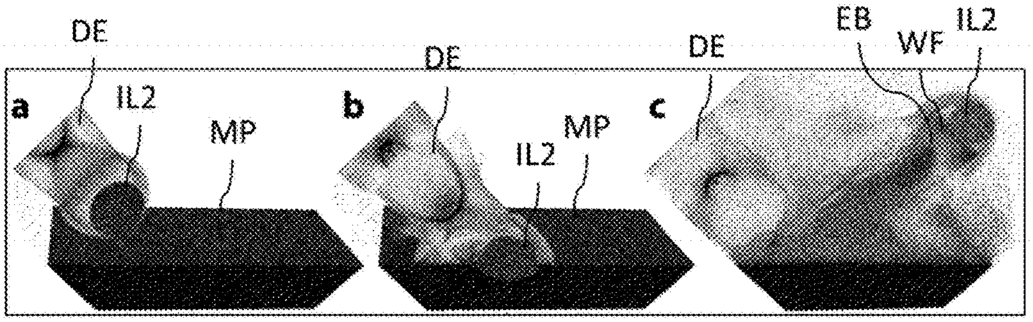

FIG. 3 groups together three instantaneous depictions a, b and c of a PIC code simulation (particle-in-cell method, which is known from the art), each of the depictions being obtained at different instants of the method of the invention according to the second variant of the invention. The three instantaneous depictions a, b and c of FIG. 3 illustrate the propagation of the main pulse IL2 at different instants. The electronic density DE of the dense plasma MP within the gaseous layers CG is depicted in light grayscale and the laser field of the pulse IL2 is depicted in darker grayscale. Instantaneous depiction a) illustrates the laser field of the pulse IL2, before it is reflected on the dense plasma MP having already ionized the gas on its path. Instantaneous depiction b) illustrates the laser field of the pulse IL2, while it is being reflected on the dense plasma MP. Finally, instantaneous depiction c) illustrates the laser field of the pulse IL2 after it is reflected on the dense plasma MP. In instantaneous depiction c), the laser wakefield acceleration mechanism accelerating an electron bunch EB is in addition observed, the injection of this bunch into this laser wakefield having been made possible by the heating of the electrons of the dense plasma MP by the pulse IL2.

For steps B and C, it is preferable for the main pulse IL2 causing the electrons to be heated and generating the wakefield to exhibit an intensity higher than $10^{18}$ W/cm$^2$ when it is reflected by the dense plasma MP. This makes it possible to obtain a laser field which is sufficient in order to make the wakefield acceleration mechanism possible and to cause the electrons to accelerate to energies of several hundred MeV for a charge typically higher than 10 pC, preferably higher than 100 pC. In general, in order to reach such intensities, it is necessary for the optical system SO to strongly focus the beam FF, typically at focal spots of a few μm in diameter.

According to a second variant of the invention, which is different from that illustrated in FIG. 2, the laser system SL is adapted to deliver a single laser pulse. In this second variant, the laser system SL and the optical system SO are adapted so that the pulse IL0 exhibits an intensity such that the leading temporal edge of the pulse ionizes the target CS and generates the dense plasma MP and so that the pulse IL0 generates the wakefield in the gas layer and induces the heating of the electrons of the dense plasma causing the injection. As specified above, it is preferable for the pulse IL0 to exhibit an intensity higher than $10^{18}$ W/cm$^2$ when it is reflected by the dense plasma in order to make it possible to accelerate the electrons to energies of several hundred MeV. In this second variant, it is necessary for the pulse IL0 to be focused toward the target so as to be s-polarized and obliquely incident in order to make injection only via the heating of the electrons of the plasma possible.

This second variant is not the preferred variant of the invention since it does not make it possible to optimize the different injection and acceleration parameters separately. It does, however, present the advantage of being very simple to implement since it requires no alignment between several beams and no fine time control between different pulses.

The first variant of the invention is more complicated to implement than the second variant of the invention since it requires the alignment of two pulses IL1, IL2 and the fine control of the time delay Δt between these pulses (see below). It is, however, preferred to the second variant since it makes it possible to control the injection and acceleration parameters better, for example via the time delay Δt between the prepulse and the main pulse or indeed the temporal contrast of the main pulse.

Indeed, preferably, in the first variant of the invention, the laser system SL is adapted so that the temporal contrast of the main pulse is higher than $10^8$, preferably higher than $10^{10}$ when the dense plasma MP is generated. The choice of such a temporal contrast is preferred for an intensity of the focused laser beam FF higher than $10^{18}$ W/cm$^2$ on the target, so that the base of the temporal profile of the main pulse does not exhibit an intensity which is sufficient in order to ionize the solid target between a few picoseconds and a few nanoseconds before the intensity peak of the main pulse. This makes it possible to prevent the dense plasma from extending toward the vacuum according to an exponential density profile over a scale length L higher than a wavelength $\lambda_2$ of the main pulse, before the intensity peak of the main pulse IL2 is reflected on the dense plasma MP. If it was the case that $$L>\lambda_2$$

before the intensity peak of the main pulse IL2 was reflected on the dense plasma MP, the spatiotemporal properties of the beam FR which is reflected by the dense plasma MP would be too strongly degraded in order to make it possible to accelerate the electrons using a wakefield acceleration mechanism.

Likewise, still preferably, the laser system SL is adapted so that the temporal contrast of the prepulse too is higher than $10^8$, preferably higher than $10^{10}$ when the dense plasma MP is generated. Here too, the choice of such a temporal contrast ensures that the bottom of the temporal profile of the prepulse does not exhibit an intensity which is sufficient in order to ionize the solid target between a few picoseconds and a few nanoseconds before the main pulse. This makes it possible to prevent the dense plasma from extending toward the vacuum according to an exponential density profile over a scale length L higher than a wavelength $\lambda_2$ of the main pulse, before the main pulse IL2 is reflected on the dense plasma MP.

Thus, preferably, the method of the first variant comprises a step, prior to steps A and B, of increasing the temporal contrast of the main pulse (and optionally of the prepulse) by reflection on one or more additional plasma mirrors in order to guarantee that the temporal contrast of the main pulse (and of the prepulse, if applicable) is higher than $10^8$, preferably higher than $10^{10}$. Increasing the temporal contrast of a laser pulse using a plasma mirror is a method well known to a person skilled in the art (see, for example, Lévy, Anna, et al. "Double plasma mirror for ultrahigh temporal contrast ultraintense laser pulses". *Optics letters* 32.3 (2007): 310-312).

Preferably, according to a preferred embodiment of the first variant of the invention, denoted by MD, the laser system SL and the optical system SO are adapted so that the time delay Δt is sufficiently low in order for the scale length L of the gradient of the dense plasma to be lower than a wavelength $\lambda_2$ of the main pulse IL2. As explained above, this makes it possible to guarantee that the spatiotemporal properties of the beam FR which is reflected by the dense plasma MP are sufficiently good in order to make it possible to accelerate the electrons.

More generally, controlling the time delay Δt makes it possible to precisely control the scale length L of the gradient of the dense plasma MP when the pulse IL2 is reflected on the latter. Indeed, after the dense plasma is generated by IL1 and during the delay Δt before the arrival of IL2, the plasma dilates toward the vacuum (along the normal $\vec{n}$ to the dense plasma MP) at a speed ranging from a few nm/ps to a few hundred nm/ps. Now, the larger the delay, the larger the scale length L of the gradient of the dense plasma MP and the easier it is to extract electrons from the dense plasma MP when the pulse IL2 is reflected on the latter in order to accelerate them. Thus, preferably, the method of the invention comprises a step of adjusting the time delay Δt in order to optimize the charge of the electron bunch injected into the wakefield. This time delay Δt can, for example, be controlled by means of a delay line on the optical path of the main pulse IL2.

Figure 4A:
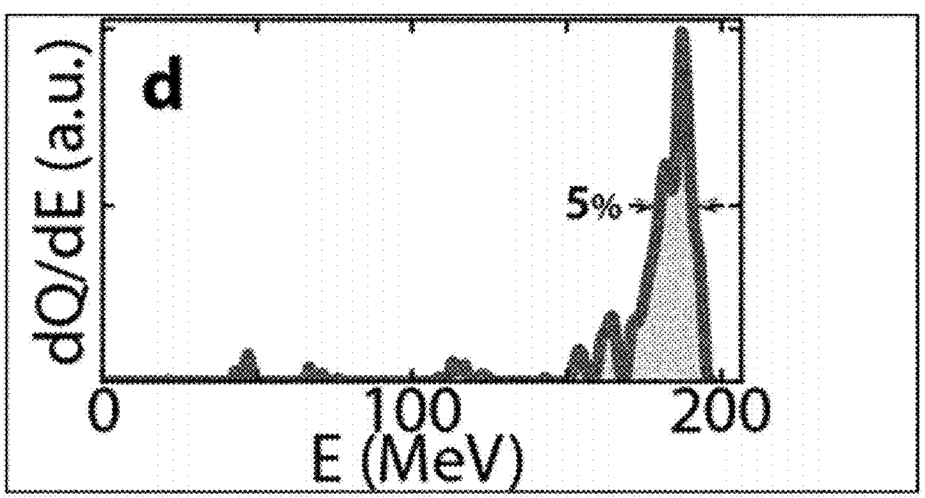

Still preferably, in the embodiment MD, the time delay Δt is between 50 fs and 200 ps, preferably 100 fs and 50 ps. Indeed, by means of simulations and experiments, the inventors realized that this range is optimal for making it possible to inject a high charge into, and accelerate a high charge in, the laser wakefield. This range of the time delay Δt between 50 fs and 200 ps corresponds (following the energy of the prepulse IL1) to a scale length L between $\sim\lambda_2/40$ and $\sim\lambda_2/5$, respectively. By choosing a time delay Δt between 50 fs and 200 ps, the inventors observed, by simulation, that it is possible to obtain very localized injection of an electron bunch EB into the wakefield WF with a charge ranging up to one nC with a main pulse of 10 J, of 30 fs, when the scale length L is $\lambda_2/10$ and the density of the gas is $10^{18}$ cm$^{-3}$. By way of illustrative example, FIG. 4A is a graphical depiction of a spectrum of the electron beam FE generated by the system of the invention. On the x-axis the energy of the electron bunch is depicted and on the y-axis the charge of the electrons is depicted. This spectrum is obtained by simulation after an acceleration length of 1.5 mm for a laser source SL delivering main pulses IL2 of 25 fs and with an energy of 2 J. It can be observed that the system 1 of the invention makes it possible to obtain an electron bunch with a charge of 400 pC with a divergence of the order of one mrad and for an energy of 185 MeV and for a low energy dispersal (around 5%)

Figure 4B:
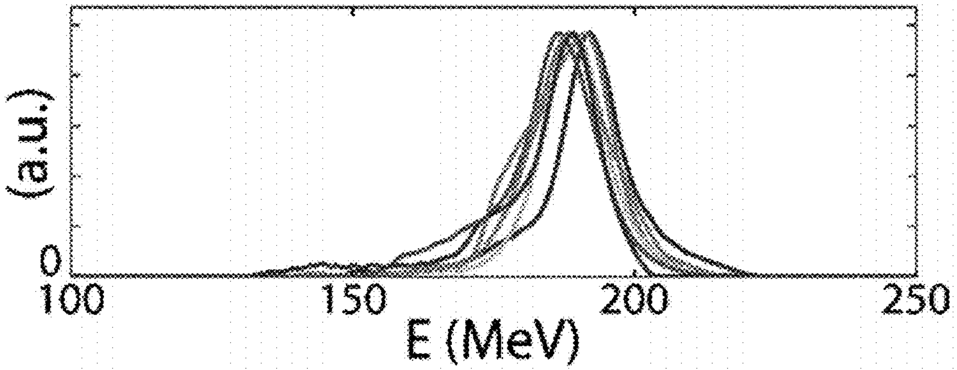

The inventors carried out experiments with main laser pulses exhibiting an energy of 450 mJ with a duration of 30 fs which are focused on the dense plasma with an intensity of $3.10^{18}$ W/cm$^2$. FIG. 4B is a graphical depiction of 5 spectra of bunches EB generated by the system of the invention for 5 different pulses IL2 in for the aforementioned conditions. FIG. 4B illustrates well the fact that the bunches EB are stable for an energy of 180 MeV with an energy dispersal lower than 10% and for a charge of 17 pC per bunch.

Preferably, the method implemented in the first variant of the invention comprises a step, prior to steps A and B, of generating the first laser pulse and the second laser pulse from the same laser pulse, referred to as the initial laser pulse. For this purpose, the system 1 comprises an optical element (typically either a 95%/5% beam splitter or a "sub-mirror" which is smaller than the laser beam in order to select only a subportion of it) which separates the initial pulse into two pulses: the prepulse IL1 and the main pulse IL2. The main pulse IL2 is then focused by the optical system SO with a time delay Δt, typically controlled by a delay line on the optical path of the main pulse IL2. This embodiment presents the advantage of making it possible to use a single laser in the system 1 of the invention. Alternatively, according to another embodiment, the pulses IL1 and IL2 are generated from two different laser sources. Furthermore, in the first variant of the invention, it is not necessary for the pulses IL1 and IL2 to exhibit the same wavelength, although this can be preferable in order to be able to use the same optical components (mirrors, parabolas or lenses) of the optical system SO in order to be able to focus these pulses.

Preferably, the optical path of the laser beam is carried out under a high vacuum (pressure lower than $10^{-3}$ mbar), preferably under an ultra-high vacuum (pressure lower than $10^{-6}$ mbar), at least from the point where it is focused by the optical system SO in order to prevent any nonlinear effect when the laser beam is propagated. In a manner known per se, the system 1 comprises one or more rough pumps and one or more turbomolecular pumps in order to obtain this high or rough vacuum.

In the first variant of the invention, it is preferable for the angle of incidence of the prepulse IL1 on the target CS and of the main pulse IL2 on the dense plasma MP not to exceed 75° in order to prevent their respective focal spots from being too spread out on the surface of the solid target CS, thus reducing the peak amplitude of the electric field induced by these pulses.

Figure 5:
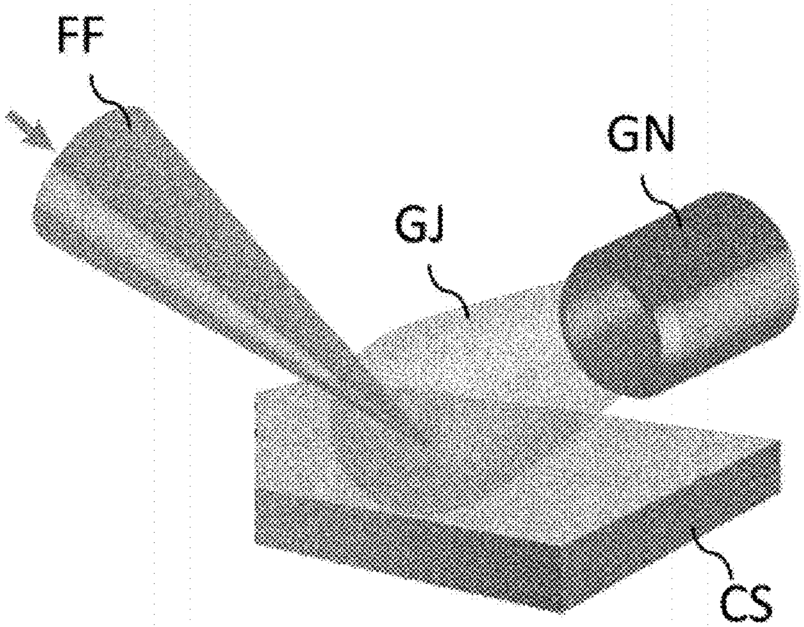

FIG. 5 illustrates a first embodiment of the invention in which the system 1 comprises a gas burner GN connected to a gas tank (which is not depicted). The gas burner is adapted to deliver a gas jet GJ configured to form the gas layer CG. This first embodiment presents the advantage of being simple to implement.

Figure 6:
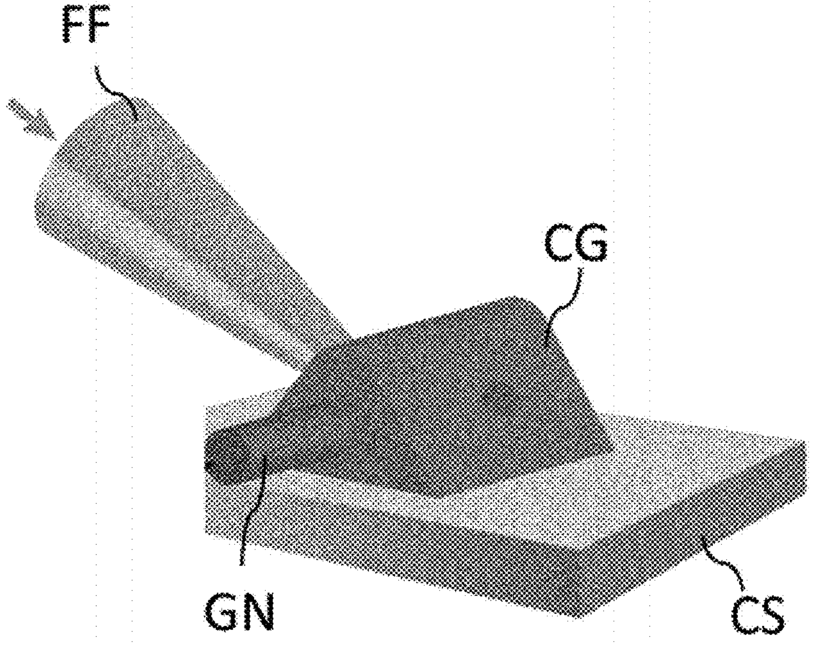

FIG. 6 illustrates a particular embodiment of the embodiment of FIG. 5 in which the system furthermore comprises a gas cell CG sealed or partially sealed by the target CS. The walls of the gas cell are impermeable to the gas delivered into the gas cell by the gas burner GN and comprise two openings, one for letting the incident laser beam through and the other for making the reflected beam and the accelerated electrons leave. Thus, the target forms a wall which makes the gas cell partially hermetic to the gas, which makes it possible to considerably reduce the gas leakage into the system 1. This makes it possible, inter alia, to use the rough pumps and the turbomolecular pumps, for producing the high or ultra-high vacuum, less. In addition, this makes it possible to limit the propagation of the focused laser beam FF in the gas before it is reflected by the dense plasma MP, which limits the nonlinear effects which there can be in this portion at very high pressure.

Figure 7:
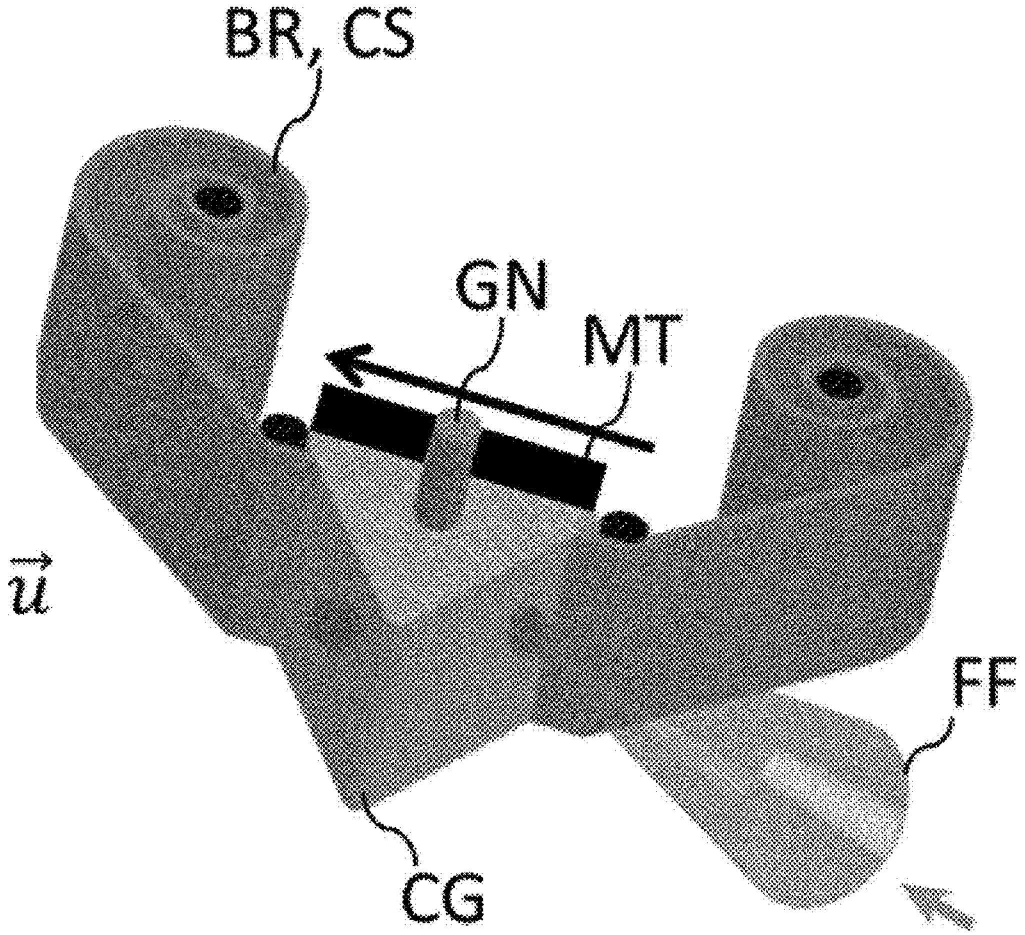

FIG. 7 illustrates a particular embodiment of the embodiment of FIG. 6, in which the target CS is formed by a piece of tape which unwinds from a spool BR, so as to be renewed from one shot to the next. The cell is sealed or partially sealed by the spool of tape BR. In this embodiment, the system 1 comprises a motor assembly MT adapted to unwind the tape into the cell, for example by translation in one direction u. This embodiment makes it possible to easily renew the target without having to modify the alignment of the assemblage, for example when the beam FF has excessively degraded the surface SS of the target CS where the beam FF was focused. This therefore makes it possible to have a higher repetition rate of the electron beam. According to an embodiment which is different from that illustrated in FIG. 7, the system 1 does not comprise a gas cell CG, although this brings about higher gas leakage.

Preferably, in the system of the embodiments of FIGS. 5 to 7, the gas tank contains helium and/or hydrogen and/or nitrogen. Using a gas of low atomic mass such as the aforementioned gases makes it possible to ensure that the injected electrons in the invention originate only from the dense plasma and not from the gaseous layer. Using gas with a larger atomic mass would, indeed, bring about higher energy dispersal in the electron beam since there would then also be electrons injected from the gas.

Preferably, in the invention, the gas burner is adapted so that an average pressure in the gas layer CG is between 0.1 atm and 200 atm, preferably between 0.5 atm and 50 atm. This pressure is adjusted as a function of the desired energy of the electron beam. Indeed, a relatively lower pressure makes it possible to obtain a relatively higher energy and a higher charge since, in this case, the bubble in the wakefield of the laser pulse is larger, which makes it possible to trap a larger number of electrons.

Indeed, the scaling laws of the LWFA mechanism show that, in order to reach higher energies, it is necessary to reduce the density of the gas. Reducing the gas density makes it possible to increase the phase velocity of the wakefield wave (which depends on the density of the gas) and therefore makes it possible to increase the distance at the end of which the accelerated electrons "escape" the bubble of the laser wakefield and get restrained. This distance is called the dephasing length. However, lowering the density of the gas makes it necessary to guide the laser pulse over larger distances. This can be performed using "self-guiding" using nonlinear effects in the gas (but this effect requires a higher laser power the lower the density of the gas is). This can also be performed by modifying the profile of the gas (in order for it to act like a sort of lens) using capillaries or other wholly optical techniques. Finally, lowering the density of the gas is found to also increase the size of the bubble and the charge which can theoretically be injected into it without affecting it.

The invention claimed is:

1. A method for accelerating electrons using laser-plasma interaction, wherein at least one laser pulse (IL0) is directed onto a surface (SS) of a target in the condensed state (CS), said surface being covered with a gas layer (CG), the intensity of said at least one laser pulse being sufficient in order to:

in a step A, generate, from the target in the condensed state, a dense plasma (MP);

in a step B, after reflection by the dense plasma, generate a laser wakefield (WF) in the gas layer;

in a step C, heat the electrons of said dense plasma to an energy such that a bunch (EB) of said electrons is injected into said wakefield in order to be accelerated therein, said at least one laser pulse, or at least a second pulse reflected by the dense plasma and heating electrons of the dense plasma, being obliquely incident on said target.

2. The method as claimed in claim 1, wherein:

generation of the dense plasma in step A is induced by a first of said at least one laser pulse, being a prepulse (IL1), steps B and C are induced by the second of said at least one laser pulse, being a main pulse (IL2), in step B, said main pulse is spatially superimposed on the prepulse and exhibits a time delay (Δt) with respect to the prepulse.

3. The method as claimed in claim 2, wherein said time delay (Δt) is sufficiently small in order for a scale length of the gradient (L) of the dense plasma to be lower than a wavelength ($\lambda_2$) of the main pulse.

4. The method as claimed in claim 3, wherein said time delay (Δt) is between 50 fs and 200 ps.

5. The method as claimed in claim 2, comprising a step of adjusting said time delay (Δt) so as to optimize a charge of said electron bunch injected into said wakefield.

6. The method as claimed in claim 2, wherein, in step A, the intensity of the prepulse is higher than $10^{15}$ W/cm$^2$ on said surface and wherein, in step B, the intensity of the main pulse is higher than $10^{18}$ W/cm$^2$ after reflection by said dense plasma.

7. The method as claimed in claim 2, further comprising a step, prior to steps A and B, of generating the prepulse and the main pulse from the same at least one laser pulse, referred to as the initial laser pulse.

8. The method as claimed in claim 2, further comprising a step, prior to steps A and B, of increasing the temporal contrast of the main pulse by reflection on one or more additional plasma mirrors.

9. The method as claimed in claim 1, wherein an average pressure in the gas layer is between 0.1 atm and 200 atm.

10. A system for accelerating electrons using laser-plasma interaction, comprising:

a target in the condensed state (CS) covered with a gas layer (CG), a laser system (SL) configured to generate at least one laser pulse (IL0), an optical system (SO) configured to direct said at least one laser pulse onto a surface (SS) of the target in the condensed state, the laser system and the optical system further being configured so that the intensity of said at least one laser pulse is sufficient in order to:

generate, from the target in the condensed state, a dense plasma (MP);

after reflection by the dense plasma, generate a wakefield (WF) in the gas layer;

heat the electrons of said dense plasma to an energy such that a bunch (EB) of said electrons is injected into said wakefield in order to be accelerated there, the optical system further being configured so that said at least one laser pulse, or at least a second pulse (IL2) reflected by the dense plasma and heating electrons of the dense plasma, is obliquely incident on said target.

11. The system as claimed in claim 10, wherein the laser system and the optical system are configured to:

generate a first said at least one laser pulse, being a prepulse (IL1), and direct it toward the target in order to generate said dense plasma, generate said second pulse (IL2), being a main pulse, and direct it toward the target in order to generate said wakefield in the gas layer and induce said heating of the electrons of said dense plasma, said main pulse, when it is reflected by the dense plasma, being spatially superimposed on the prepulse.

12. The system as claimed in claim 11, wherein said laser system is configured so that the temporal contrast of the main pulse is higher than $10^8$, preferably higher than $10^{10}$.

13. The system as claimed in claim 10, comprising a gas burner (GN) connected to a gas tank, the gas burner being configured to deliver a gas jet (GJ) configured to form the gas layer.

14. The system as claimed in claim 13, comprising a gas cell sealed or partially sealed by the target, the gas burner being configured to deliver the gas jet into the gas cell.

15. The system as claimed in claim 12, wherein said target is formed by a piece of tape which unwinds from a spool (BR), said system comprising a motor assembly (MT) configured to unwind said tape into the cell.

16. The system as claimed in claim 12, wherein the gas tank comprises one or more of helium, hydrogen, and nitrogen.

17. The system as claimed in claim 12, wherein the gas burner is configured so that an average pressure in the gas layer is between 0.1 atm and 200 atm, preferably between 0.5 atm and 50 atm.

18. The method as claimed in claim 10, wherein:

said at least one laser pulse, or at least the second pulse reflected by the dense plasma and heating electrons of the dense plasma, is s-polarized.

19. The method as claimed in claim 1, wherein:

said at least one laser pulse, or at least the second pulse reflected by the dense plasma and heating electrons of the dense plasma, is s-polarized.

20. The method as claimed in claim 1, wherein an average pressure in the gas layer is between 0.5 atm and 50 atm.

* * * * *